US012707268B2

(12) United States Patent
Xu et al.

(10) Patent No.: US 12,707,268 B2
(45) Date of Patent: Aug. 11, 2026

(54) PERFORMING SECURITY UPDATES WITHOUT RESYNCHRONIZATION

(71) Applicant: Nokia Technologies Oy, Espoo (FI)

(72) Inventors: Xiang Xu, Beijing (CN); Henri Markus Koskinen, Espoo (FI); Ilkka Antero Keskitalo, Oulu (FI); Jedrzej Stanczak, Wroclaw (PL); Ping Yuan, Beijing (CN)

(73) Assignee: Nokia Technologies Oy, Espoo (FI)

( * ) Notice: Subject to any disclaimer, the term of this patent is extended or adjusted under 35 U.S.C. 154(b) by 316 days.

(21) Appl. No.: 18/559,392

(22) PCT Filed: May 17, 2021

(86) PCT No.: PCT/CN2021/094190

§ 371 (c)(1),
(2) Date: Nov. 7, 2023

(87) PCT Pub. No.: WO2022/241624

PCT Pub. Date: Nov. 24, 2022

(65) Prior Publication Data

US 2024/0236685 A1 Jul. 11, 2024

(51) Int. Cl.
*H04W 12/00* (2021.01)
*H04W 12/30* (2021.01)
(Continued)

(52) U.S. Cl.
CPC ........... *H04W 12/30* (2021.01); *H04W 36/08* (2013.01); *H04W 84/06* (2013.01)

(58) Field of Classification Search
CPC ...... H04W 12/30; H04W 36/08; H04W 84/06
See application file for complete search history.

(56) References Cited

U.S. PATENT DOCUMENTS

2012/0003962 A1* 1/2012 Jeon .................. H04W 36/0083 455/437
2014/0086161 A1* 3/2014 Cai .................. H04W 56/0045 370/329
(Continued)

FOREIGN PATENT DOCUMENTS

AU 2008245604 A1 * 11/2008 ............. H04L 9/083
CN 110140383 A * 8/2019 ............ H04W 72/23
(Continued)

OTHER PUBLICATIONS

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.
(Continued)

*Primary Examiner* — Wesley L Kim
*Assistant Examiner* — Fabian Botello
(74) *Attorney, Agent, or Firm* — Barta Jones, PLLC

(57) ABSTRACT

A base station, in communication with a UE using a first serving cell, determines a need to perform a security update for the UE and sends a command including information to perform the security update and indication of a time to execute the security update to change to a new security configuration. In response to the time occurring, a security update is performed to a new security configuration for use for communication with the UE using a second serving cell. The UE receives the information and the indication and performs, without performing a random-access procedure, the security update to the new security configuration to use for communication with the second serving cell.

13 Claims, 7 Drawing Sheets

(51) Int. Cl.
*H04W 36/08* (2009.01)
*H04W 84/06* (2009.01)

(56) References Cited

U.S. PATENT DOCUMENTS

| | | | | |
|---|---|---|---|---|
| 2018/0302834 | A1 | 10/2018 | Zhang et al. | |
| 2019/0158282 | A1* | 5/2019 | Liu | H04L 41/0816 |
| 2020/0137820 | A1* | 4/2020 | Kim | H04W 4/70 |
| 2021/0120618 | A1* | 4/2021 | Lee | H04W 76/19 |
| 2021/0211956 | A1* | 7/2021 | Kim | H04W 12/043 |

FOREIGN PATENT DOCUMENTS

| | | | | |
|---|---|---|---|---|
| EP | 2197147 | A1 * | 6/2010 | H04W 12/08 |
| JP | 2013192232 | A * | 9/2013 | H04L 1/1812 |
| WO | 2020/088260 | A1 | 5/2020 | |
| WO | WO-2022061780 | A1 * | 3/2022 | H04W 24/02 |

OTHER PUBLICATIONS

"3rd Generation Partnership Project; Technical Specification Group Radio Access Network; NG-RAN; NG Application Protocol (NGAP) (Release 16)", 3GPP TS 38.413, V16.5.0, Apr. 2021, pp. 1-473.
"3rd Generation Partnership Project; Technical Specification Group Services and System Aspects; Procedures for the 5G System (5GS); Stage 2 (Release 17)", 3GPP TS 23.502, V17.0.0, Mar. 2021, pp. 1-646.
"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340, V16.5.0, Mar. 2021, pp. 1-84.
"3rd Generation Partnership Project; Technical Specification Group Radio Access Network; NR; Medium Access Control (MAC) protocol specification (Release 16)", 3GPP TS 38.321, V16.4.0, Mar. 2021, pp. 1-157.
"3rd Generation Partnership Project; Technical Specification Group Radio Access Network; NR; Packet Data Convergence Protocol (PDCP) specification (Release 16)", 3GPP TS 38.323, V16.3.0, Mar. 2021, pp. 1-40.
"3rd Generation Partnership Project; Technical Specification Group Radio Access Network; NR; Radio Link Control (RLC) protocol specification (Release 16)", 3GPP TS 38.322, V16.2.0, Dec. 2020, pp. 1-33.
International Search Report and Written Opinion received for corresponding Patent Cooperation Treaty Application No. PCT/CN2021/094190, dated Feb. 8, 2022, 10 pages.
"Signalling Solution for Feeder Link Switching of NTN", 3GPP TSG-RAN WG2 Meeting #114 Electronic, R2-2104826, Agenda: 8.10.3.1, Vodafone, May 19-27, 2021, pp. 1-6.
"Network N2-handover handling—corrections and clarifications", 3GPP TSG-SA WG3 Meeting #91bis, S3-181755, Ericsson, May 21-25, 2018, 4 pages.
Office action received for corresponding Chinese Patent Application No. 202180100554.7, dated Nov. 1, 2024, 6 pages of office action and 3 pages of translation available.
Communication pursuant to Article 94(3) EPC for European Application No. 21940081.9, issued on Oct. 1, 2025, 6 pages.
Extended European Search Report received for corresponding European Patent Application No. 21940081.9, dated Dec. 19, 2024, 11 pages.
"Discussion on inter-CU LTM", 3GPP TSG-RAN WG2 Meeting #125bis, R2-2402441, Agenda: 8.6.2, OPPO, Apr. 15-19, 2024, pp. 1-6.
"Misalignment Behavior in Changing the Security Algorithms", 3GPP TSG-RAN WG2 Meeting #123, R2-2308430, Agenda: 5.1.3.1, Ericsson, Aug. 21-25, 2023, pp. 1-3.
"CB#11 IABInterDonorMigration", 3GPP TSG-RAN WG3 #112-e, R3-206854, Agenda: 13.2.1, Qualcomm, Nov. 2-13, 2020, 38 pages.
Office action received for corresponding Indian Patent Application No. 202347077509, dated Aug. 14, 2025, 7 pages.
Office action received for corresponding Chinese Patent Application No. 202180100554.7, dated Mar. 14, 2025, 3 pages of office action and 3 pages of translation available.

* cited by examiner

PERFORMING SECURITY UPDATES WITHOUT RESYNCHRONIZATION

RELATED APPLICATION

This application claims priority to PCT Application No. PCT/CN2021/094190, filed on May 17, 2021, which is incorporated herein by reference in its entirety.

TECHNICAL FIELD

Exemplary embodiments herein relate generally to wireless networks and, more specifically, relates to performing security updates in those networks.

BACKGROUND

A non-terrestrial network (NTN) is a network or a segment of a network that uses satellites, airborne vehicles, or spaceborne vehicles for transmission. An NTN network node may include access and mobility management functions (AMFs), where each AMF might correspond to a country. Two AMFs might use a single base station (e.g., implemented in a satellite, or implemented on the ground and transmitted via a satellite) to communicate with user equipment (UEs), which are wireless, typically mobile devices. This base station might serve an area that encompasses parts or all of one or more countries.

When the UE crosses a border between the two countries, the UE is transferred from one AMF for the originating country and to the AMF for the destination country. This involves a radio resource control (RRC) reconfiguration procedure, which typically involves reconfiguration with synchronization between the UE and the network and security key refreshing.

This type of reconfiguration with synchronization between the UE and the network and security key refreshing is also involved in other areas, such as Integrated Access & Backhaul (IAB). One commonality between the NTN and the IAB scenarios is a serving cell acts as both source cell and target cell during a handover, or the UE remains synchronized with a serving cell during a handover.

BRIEF SUMMARY

This section is intended to include examples and is not intended to be limiting.

In an exemplary embodiment, a method is disclosed that includes receiving, at a user equipment in communication with a first serving cell of a base station, a command comprising information to perform a security update to a new security configuration and indication of a time to execute the security update to the new security configuration. The method also includes, in response to the time occurring, performing, by the user equipment without performing a random-access procedure, the security update to the new security configuration to use for communication with a second serving cell.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: receiving, at a user equipment in communication with a first serving cell of a base station, a command comprising information to perform a security update to a new security configuration and indication of a time to execute the security update to the new security configuration; and in response to the time occurring, performing, by the user equipment without performing a random-access procedure, the security update to the new security configuration to use for communication with a second serving cell.

An exemplary computer program product includes a computer-readable storage medium bearing computer program code embodied therein for use with a computer. The computer program code includes: code for receiving, at a user equipment in communication with a first serving cell of a base station, a command comprising information to perform a security update to a new security configuration and indication of a time to execute the security update to the new security configuration; and code, in response to the time occurring, for performing, by the user equipment without performing a random-access procedure, the security update to the new security configuration to use for communication with a second serving cell.

In another exemplary embodiment, an apparatus comprises means for performing: receiving, at a user equipment in communication with a first serving cell of a base station, a command comprising information to perform a security update to a new security configuration and indication of a time to execute the security update to the new security configuration; and in response to the time occurring, performing, by the user equipment without performing a random-access procedure, the security update to the new security configuration to use for communication with a second serving cell.

In an exemplary embodiment, a method is disclosed that includes, at a base station in communication with a user equipment using a first serving cell, determining a need to perform a security update for the user equipment. The method includes sending by the base station to the user equipment a command comprising information to perform the security update and indication of a time to execute the security update to change to a new security configuration. The method further includes, in response to the time occurring, performing a security update to a new security configuration for use for communication with the user equipment using a second serving cell.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: at a base station in communication with a user equipment using a first serving cell, determining a need to perform a security update for the user equipment; sending by the base station to the user equipment a command comprising information to perform the security update and indication of a time to execute the security update to change to a new security configuration; and in response to the time occurring, performing a security update to a new security configuration for use for communication with the user equipment using a second serving cell.

An exemplary computer program product includes a computer-readable storage medium bearing computer program code embodied therein for use with a computer. The computer program code includes: code, at a base station in communication with a user equipment using a first serving cell, for determining a need to perform a security update for the user equipment; code for sending by the base station to the user equipment a command comprising information to perform the security update and indication of a time to execute the security update to change to a new security configuration; and code, in response to the time occurring, for performing a security update to a new security configuration for use for communication with the user equipment using a second serving cell.

In another exemplary embodiment, an apparatus comprises means for performing: at a base station in communication with a user equipment using a first serving cell, determining a need to perform a security update for the user equipment; sending by the base station to the user equipment a command comprising information to perform the security update and indication of a time to execute the security update to change to a new security configuration; and in response to the time occurring, performing a security update to a new security configuration for use for communication with the user equipment using a second serving cell.

DETAILED DESCRIPTION OF THE DRAWINGS

Figure 1:
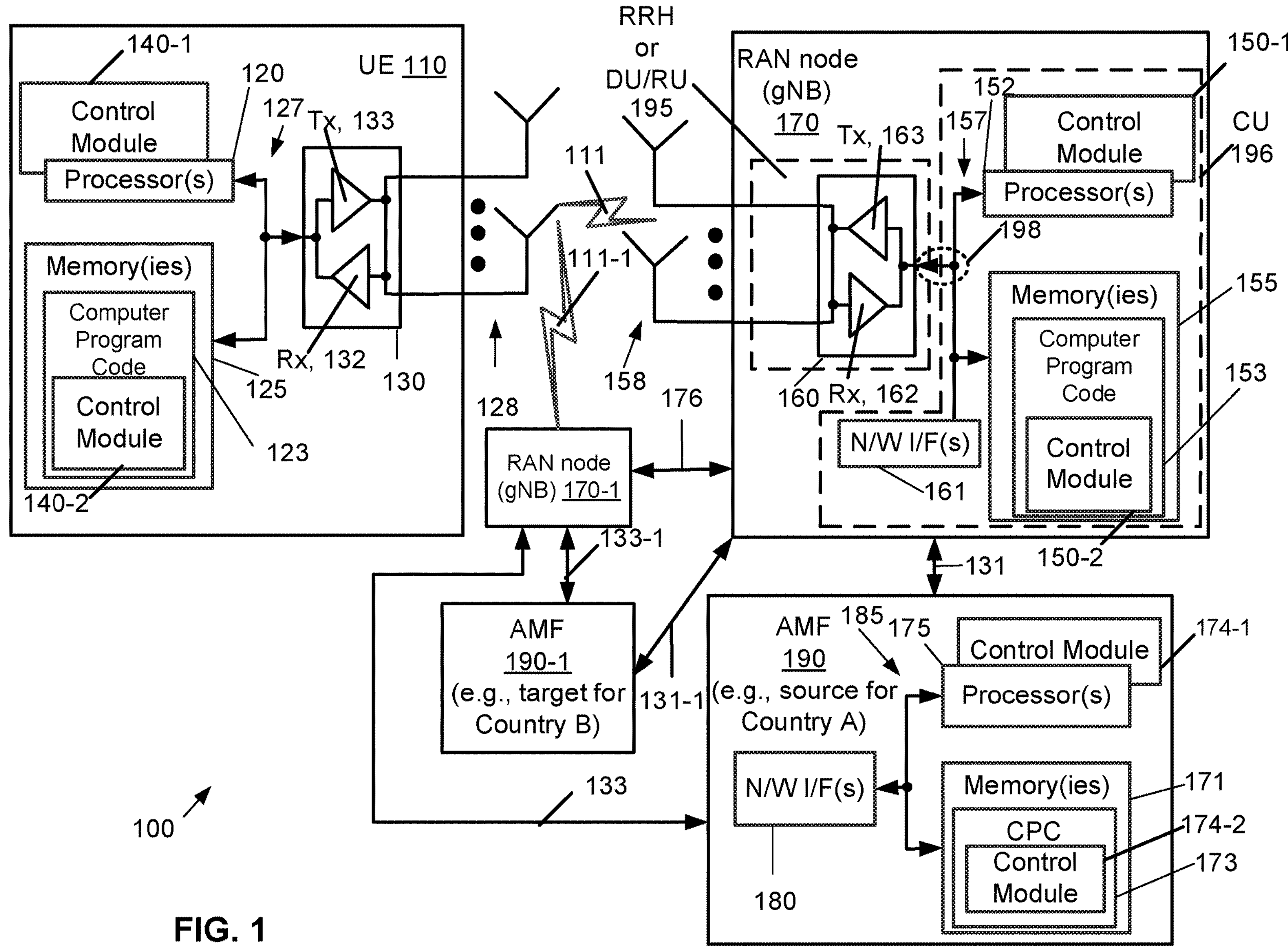
FIG. 1 is a block diagram of one possible and non-limiting exemplary system in which the exemplary embodiments may be practiced.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for performing security updates without resynchronization. Additional description of these techniques is presented after a system into which the exemplary embodiments may be used is described.

Turning to FIG. 1, this figure shows a block diagram of one possible and non-limiting exemplary system in which the exemplary embodiments may be practiced. A user equipment (UE) 110, radio access network (RAN) nodes 170 and 170-1, and AMFs 190 190-1 are illustrated.

In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111 and with RAN node 170-1 via a wireless link 111-1.

The RAN node 170 and 170-1 are base stations that provide access by wireless devices such as the UE 110 to the wireless network 100. The RAN nodes 170 and 170-1 are referred to mainly herein as gNBs, but this is merely exemplary, as described below. The two RAN nodes communicate using link 176. There may be other RAN nodes, but these are not shown. The two RAN nodes 170, 170-1 are assumed to be similar, and therefore only the internal circuitry of the RAN node 170 is described.

The RAN node 170 may be, for instance, a base station for 5G, also called New Radio (NR), or a base station for 4G, also called Long Term Evolution (LTE), or a base station for any other access technology. In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN network may include multiple gNBs. A gNB may include a central unit (CU) (gNB-CU) 196 and one or more distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-DU supports one or multiple cells. One cell is supported by one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more RAN nodes 170 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So, if there are three 120 degree cells per carrier and two carriers, then the base station has a total of 6 cells.

The wireless network 100 may include AMFs 190 and 190-1. The AMF 190 is considered to be a source AMF for Country A, and the AMF 190-1 is considered to be a target AMF for Country B, for UEs crossing from Country A to Country B at particular locations.

The RAN node 170 is coupled via a link 131 to the AMF 190 and via a link 131-1 to the AMF 190-1. The RAN node 170-1 is coupled via a link 133 to the AMF 190 and via a link 133-1 to the AMF 190-1. The links 131, 121-1, 133 and 133-1 may be implemented as, e.g., an NG interface for 5G, or an SI interface for LTE, or other suitable interface for other standards. The AMFs 190 and 190-1 are assumed to be similar, and only the internal configuration of AMF 190 is described herein.

The AMF 190 includes one or more processors 175, one or more memories 171, and one or more network interfaces (N/W I/F(s)) 180, interconnected through one or more buses 185. The one or more memories 125 include computer program code (CPC) 173. The AMF 190 includes a control module 174, comprising one of or both parts 174-1 and/or 174-2, which may be implemented in a number of ways. The control module 174 may be implemented in hardware as control module 174-1, such as being implemented as part of the one or more processors 175. The control module 174-1 may be implemented also as an integrated circuit or through other hardware such as a programmable gate array. In another example, the control module 174 may be implemented as control module 174-2, which is implemented as computer program code 173 and is executed by the one or more processors 175. For instance, the one or more memories 171 and the computer program code 173 may be configured to, with the one or more processors 175, cause the AMF 190 to perform one or more of the operations as described herein.

Note that there may be other network nodes (not shown) that may include core network functionality, and which provides connectivity via a link or links with a data network, such as a telephone network and/or a data communications network (e.g., the Internet). Such core network functionality for 5G may include, in addition to the AMF 190 and 191, user plane functions (UPF(s)) and/or session management function(s) (SMF(s)). Such core network functionality for LTE may include MME (Mobility Management Entity) functionality and/or SGW (Serving Gateway) functionality. These are merely exemplary functions that may be supported, and note that both 5G and LTE functions might be supported.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general-purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN nodes 170/170-1, and the AMFs 190/190-1, or other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, vehicles with a modem device for wireless V2X (vehicle-to-everything) communication, image capture devices such as digital cameras having wireless communication capabilities, gaming devices having wireless communication capabilities, music storage and playback appliances having wireless communication capabilities, Internet appliances (including Internet of Things, IOT, devices) permitting wireless Internet access and possibly browsing, IoT devices with sensors and/or actuators for automation applications with wireless communication tablets with wireless communication capabilities, as well as portable units or terminals that incorporate combinations of such functions.

Having thus introduced one suitable but non-limiting technical context for the practice of the exemplary embodiments, the exemplary embodiments will now be described with greater specificity.

Concerning Non-Terrestrial Networks (NTNs), 3GPP TS 23.502 defines the following:

"The Inter NG-RAN node N2 based handover procedure specified in clause 4.9.1.3 may also be used for intra-NG-RAN node handover."

"NOTE: One use case for intra-NG-RAN handover to be performed by the Inter NG-RAN node N2 based handover procedure is when an NG-RAN node serves a satellite access system that covers more than one country. In such a situation, the UE might move from a "cell" in one country into a 'cell' in another country, and the NG-RAN node may need to cause the AMF to change to an AMF serving the UE's new country."

Figure 2:
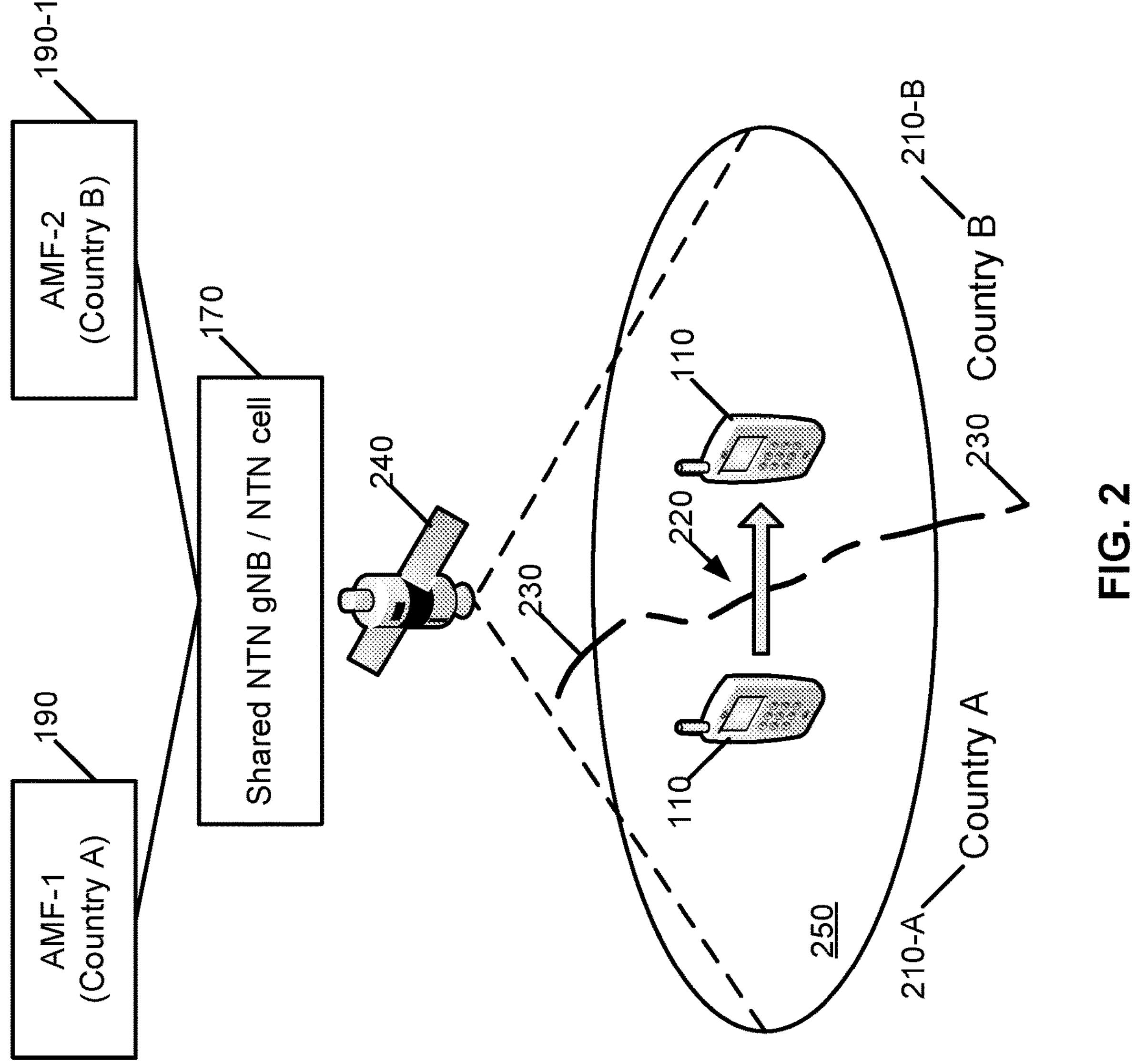
FIG. 2 illustrates an NTN deployment example when a shared gNB connects with different AMFs.

An example for NTN is shown in FIG. 2, which illustrates an NTN deployment example when a shared gNB connects with different AMFs. The shared NTN gNB 170 creates an NTN cell 250, which spans countries Country A 210-A and Country B 210-B. The countries 210 are separated by a border 230. There is an AMF-1 190 for Country A and an AMF-2 190-1 for Country B. A UE 110 is illustrated following path 220 across the border 230.

As illustrated, an NTN cell (e.g., a GEO cell) 250 may cover a large geographical area that may span more than one country 210. This cell 250 is created by an NTN payload (for example, a GEO satellite) 240. The NTN may be implemented with a transparent NTN payload, where the gNB (for example, the shared NTN gNB 170) is deployed on the ground and the NTN payload corresponds to an RF repeater. In another example embodiment, the NTN may be implemented with a regenerative NTN payload which hosts some gNB function (for example, the gNB-DU function of the shared NTN gNB 170), or hosts the full gNB function (for example, the shared NTN gNB 170). The shared NTN gNB/cell 170 connects with the AMFs 190, 190-1 from the related country 210-A, 210-B, respectively. The gNB 170 ensures a correct AMF is selected to serve the UE 110, e.g., based on the country in which the UE is located. When an RRC CONNECTED UE moves across the country border 230, the UE is still served by the same NTN gNB/cell 170. However, the serving AMF shall be changed, for example, the UE shall be served by the AMF-2 190-1 for Country B, rather the AMF-1 190 for Country A. The serving gNB 170 may initiate an N2-based Handover to change the AMF for the UE.

It should be noted that this issue may also happen in inter-donor IAB-node migration, where, because of the change of IAB donor gNB during a migration for an IAB node, the security keys of UEs served by the migrating IAB node (or a descendant IAB of the migrating IAB node) need to be changed, while the radio cell serving the UEs (i.e., a cell of the migrating IAB node, or a cell from a descendant IAB of the migrating IAB node) does not change. For example, the UE remains synchronized (and connected) to the serving cell, with the Physical Cell Identifier (PCI) remaining unchanged after the migration, even though the serving cell may use a different NR Cell Global Identifier after the migration. That is, the serving IAB node for the UE does not change during the migration of the IAB (or during the migration of the ancestor IAB). Consequently, the N2-based handover procedure or Xn-based handover procedure may be performed with exemplary proposed methods, during the migration of the IAB (or during the migration of the ancestor IAB).

With respect to RRC Reconfiguration, as defined in 3GPP TS 38.331 (copied as below), when the RRC Reconfiguration is to perform a security key refresh, a sync (or resync) involving random-access (RA) procedure is always performed. The following is the material from 3GPP TS 38.331:

RRC reconfiguration to perform reconfiguration with sync includes, but is not limited to, the following cases:

- reconfiguration with sync and security key refresh, involving RA to the PCell/PSCell, MAC reset, refresh of security and re-establishment of RLC and PDCP triggered by explicit L2 indicators;
- reconfiguration with sync but without security key refresh, involving RA to the PCell/PSCell, MAC reset and RLC re-establishment and PDCP data recovery (for AM DRB) triggered by explicit L2 indicators.
- reconfiguration with sync for DAPS and security key refresh, involving RA to the target PCell, establishment of target MAC, and for non-DAPS bearer: refresh of security and re-establishment of RLC and PDCP triggered by explicit L2 indicators;

for DAPS bearer: establishment of RLC for the target PCell, refresh of security and reconfiguration of PDCP to add the ciphering function, the integrity protection function and ROHC function of the target PCell;

for SRB: refresh of security and establishment of RLC and PDCP for the target PCell;

This ends the text from 3GPP TS 38.331.

Figure 3:
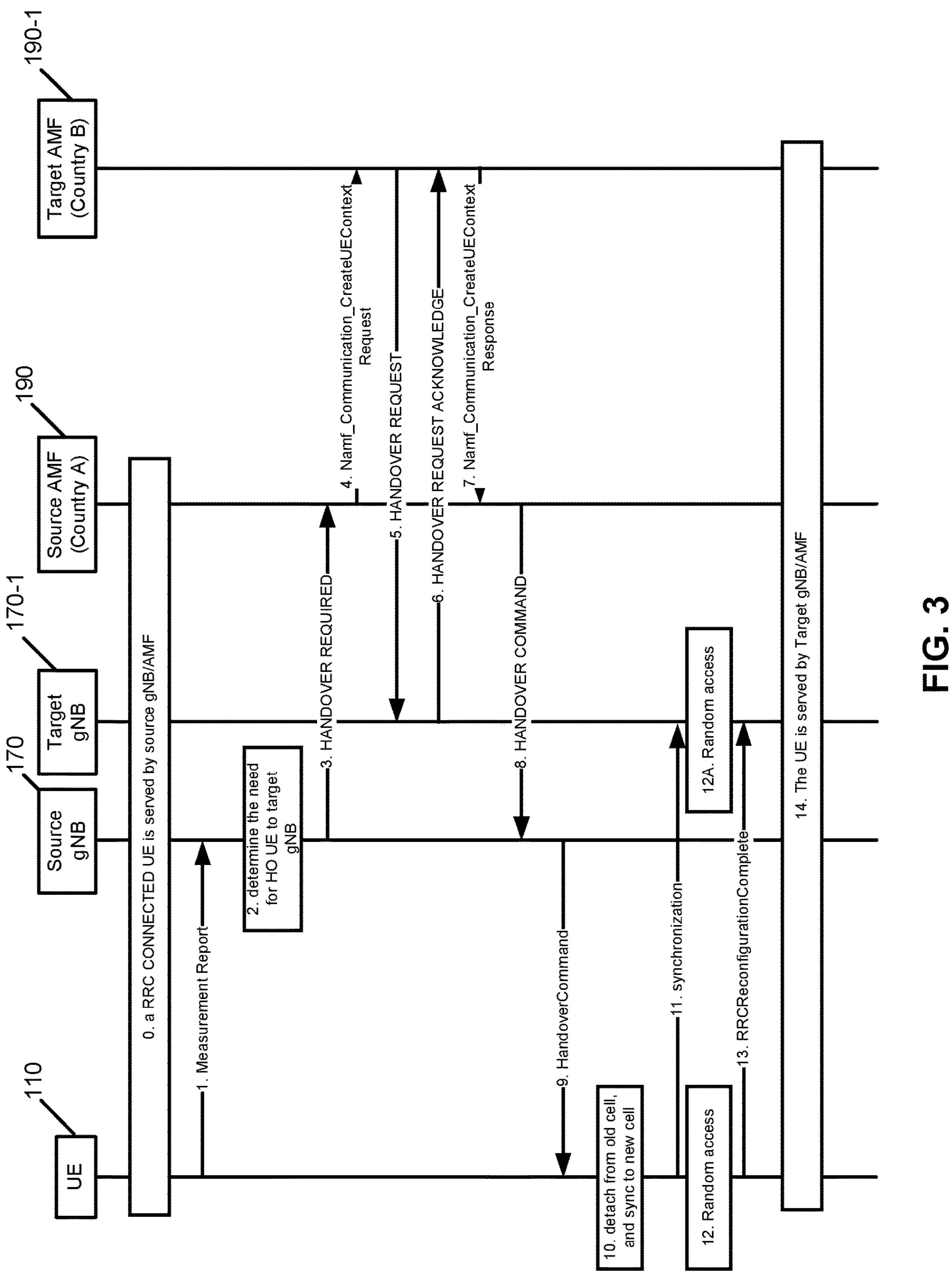
FIG. 3 is a signaling diagram illustrating an example for inter-AMF HO.

A typical N2-based inter-AMF HO is shown in FIG. 3, which is a signaling diagram illustrating an example for inter-AMF HO. When the UE 110 starts to execute the HO, it detaches from the old cell, and synchronizes to the new cell (e.g., as a target cell).

In step 0 (zero), the RRC CONNECTED mode UE is served by the source gNB 170 and the source AMF 190 from Country A. In step 2, the source gNB 170 determines the need to HO the UE to the target gNB 170-1, for example, based on the measurement report received from the UE in step 1. The source gNB 170 sends, in step 3, an NGAP HANDOVER REQUIRED message to the source AMF 190. In step 4, the source AMF 190 sends an Namf_Communication_CreateUEContext request to the target AMF 190-1 from Country B. The target AMF 190-1 sends a NGAP HANDOVER REQUEST message in step 5 to the target gNB 190-1. The target gNB responds with an NGAP HANDOVER REQUEST ACKNOWLEDGE message to the target AMF 190-1 in step 6. In step 7, the target AMF 190-1 responds with an Namf_Communication_CreateUEContext response. The source AMF 190 sends a NGAP HANDOVER COMMAND in step 8 to the source gNB 170, which sends the command to the UE in step 9. The command may be an RRCReconfiguration message (also known as a HandoverCommand). The UE 110 in step 10 detaches from the old cell, and synchs (synchronizes) to the new cell. This entails at least the UE performing a synchronization to the target gNB (step 11), the UE 110 in step 12 and the target gNB 170-1 in step 12A performing random access, and the UE 110 responding with an RRC Reconfiguration Complete message in step 13. In step 14, the UE is served by the target gNB 170-1 and the target AMF 190-1.

Possible issues with using the above call flow for the NTN case (for example, the scenario as shown in FIG. 2) include the following. When an RRC CONNECTED UE undergoes HO, the security configuration including the security key, e.g., KAMF, and also potentially the security algorithm, needs to be updated. Since the serving gNB/cell acts as both source gNB/cell and target gNB/cell, the radio configuration may remain unchanged. Current NR RRC Reconfiguration only supports "with sync and security key refresh" involving a random-access procedure which comes with delay of, e.g., tens of milliseconds. Currently, the random-access procedure allows the UE and network to separate the periods of time where PDCP PDUs protected with the previous security configuration, and PDUs protected with the new security configuration, are exchanged over the radio interface.

So, methods are needed to perform the security update without random-access procedure in a way that avoids ambiguity of the security configuration being used with different PDCP PDUs before and after an intra-cell handover.

Figure 4:
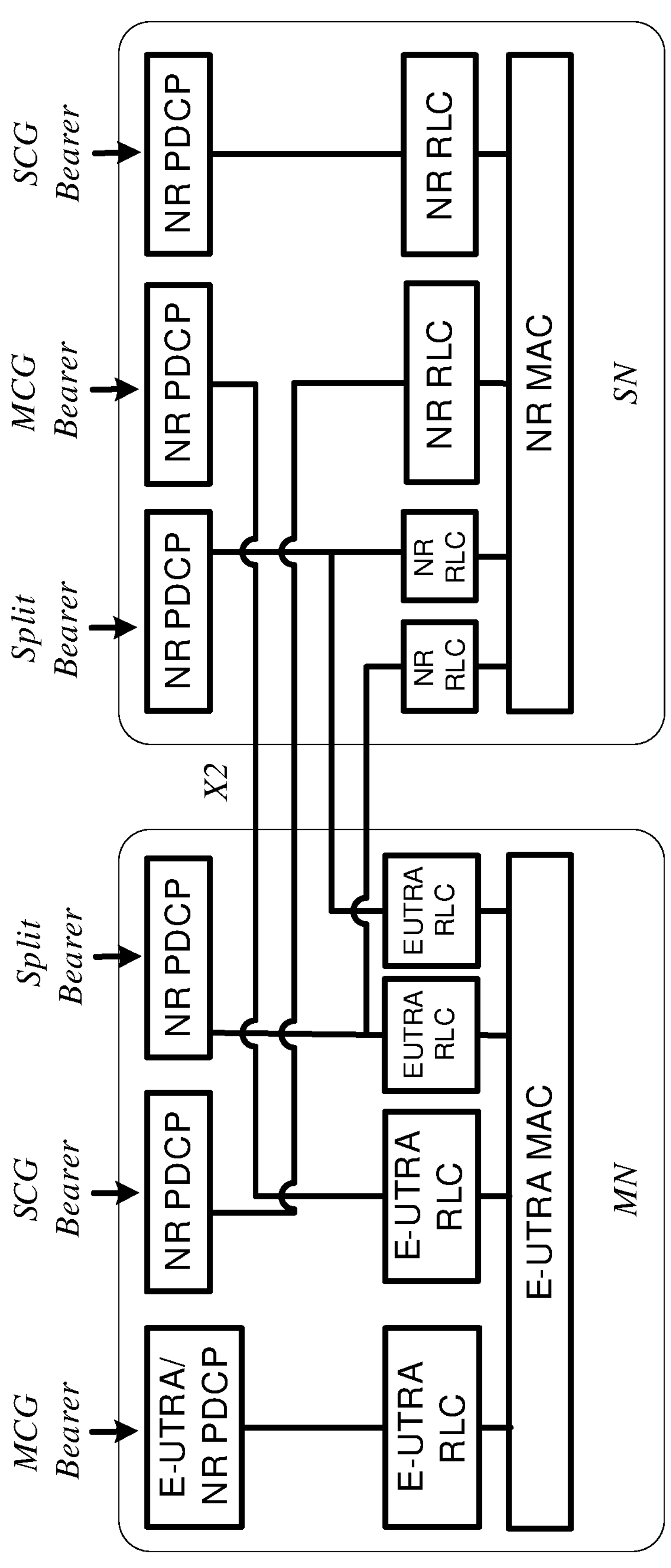
FIG. 4 is an example of a network side protocol termination options for MCG, SCG and split bearers in MR-DC with EPC (EN-DC)

Before describing this method, it is noted that, in dual connectivity, a radio bearer can have different protocol architectures as described in 3GPP TS 37.340. FIG. 4 is an example of a network side protocol termination options for MCG, SCG and split bearers in MR-DC with EPC (EN-DC). This is from FIG. 4.2.2-3 of 3GPP TS 37.340. This shows different architectures for the MN (master node) of a master cell group, MCG and the SN (secondary node) of a secondary cell group, SCG.

An example of the security key of a radio bearer changing but a random-access procedure is not necessary is when, for a radio bearer, the security key changes while there is no change to RLC/MAC/PHY layer of the bearer on a given cell group (MCG or SCG). For instance, a radio bearer could be reconfigured between an MN-terminated (meaning PDCP anchored in MN) MCG bearer and an SN-terminated split bearer (meaning PDCP anchored in SN): because of the change to the network-side PDCP-termination point the security key of the radio bearer changes, while there is no change to MCG RLC/MAC/PHY of the bearer. For this case, 3GPP TS 37.340 allows changing the logical-channel ID (LCID) used by (in this example) the MCG RLC/MAC along with the key change, thus avoiding random-access procedure on the MCG. This is summarized in 3GPP TS 37.340 Annex A. The drawback with the above LCID-change method is that the LCID space needs to accommodate two values per radio bearer.

In LTE, the UE can be commanded to perform RACH-less handover where the UE skips the random-access procedure and sends RRC reconfiguration complete message, confirming execution of the handover, based on an uplink scheduling grant from the network. In the intra-cell handover case addressed by the example embodiments herein, this does not solve the possible ambiguity of security key used with each PDCP PDU, because both the RRC reconfiguration to the UE and the response (e.g., complete message) from the UE may be received out of order with user-plane PDUs because of (H)ARQ retransmissions. This is especially true in the use cases of NTN and IAB, where PDCP round-trip time can be longer than in terrestrial networks.

To address at least some of the issues described above, exemplary embodiments herein propose a procedure for changing the UE's security configuration, for example, the security key, the security algorithm, and/or performing other security updates, and the like, without a random-access procedure or requiring two LCIDs per radio bearer. As an overview, consider the following.

1) The UE is signaled a point in time to execute the security update procedure (e.g., to update the security key, the security algorithm, and/or other parameters). This point in time may be indicated in terms of numbering of radio frames and/or slots, or in a Universal Time Coordinated (UTC) time format, or a timer, or through any other indication for which the UE can determine the point in time.

2) Execution of the security update procedure at the specified time may involve the following.

a) A PDCP re-establishment procedure. See, e.g., 3GPP TS 38.323, section 5.1.2.

b) An RLC re-establishment procedure. See, e.g., 3GPP TS 38.322, section 5.1.2.

i) This is used to clear the transmission/reception pipeline from PDCP PDUs protected with the previous key, which is also the purpose of the following HARQ-process-related actions at the MAC layer (see below).

c) A new "MAC re-establishment" procedure involving the following.

i) No random-access procedure, and no implicit requirement for a random-access procedure at a later stage to continue transmission.

As an example of such an implicit requirement, it is noted that the current MAC-reset procedure involves considering all time-alignment timers as expired, which requires a random-access procedure in order to re-obtain uplink time alignment with the network, in order to continue with transmissions related to MAC-SDU transfer.

ii) "Reset" of all HARQ processes, e.g., by performing the following:

setting the New-Data Indicators (NDIs) for all uplink HARQ processes to the value 0 (zero), or to any other value that resets these;

flushing the soft buffers for all DL HARQ processes; and for each DL HARQ process, considering the next received transmission for a TB as the very first transmission.

Now that an overview has been provided, additional details are provided.

Figure 5:
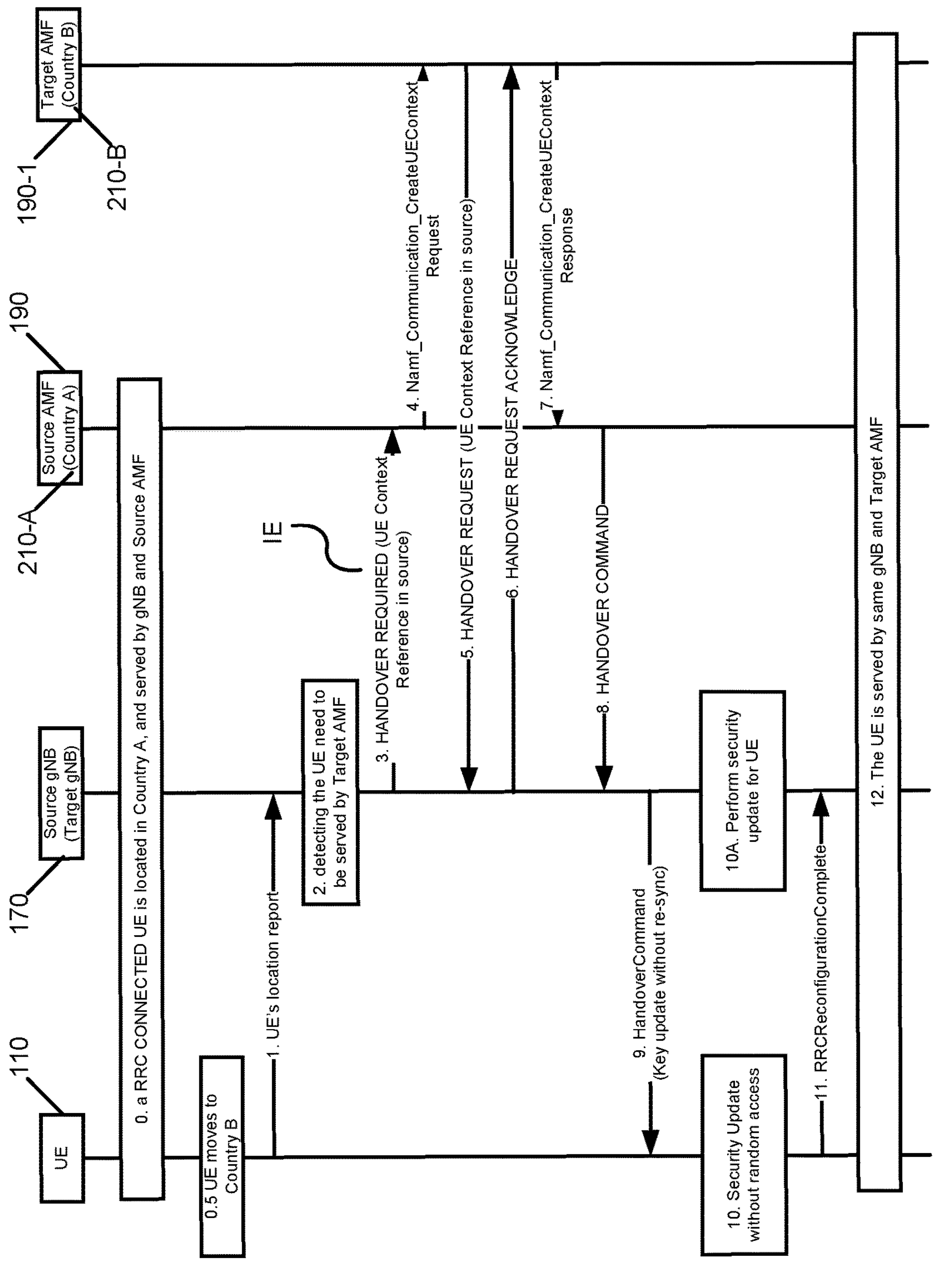
FIG. 5 is a signaling diagram illustrating a call flow example for inter-AMF HO, in accordance with an exemplary embodiment.

An example call flow with an exemplary proposed method is shown in FIG. 5, which is a signaling diagram illustrating a call flow example for inter-AMF HO, in accordance with an exemplary embodiment. In this example, the source gNB 170 is also the target gNB 170-1. To clarify, the same gNB is both the source gNB and the target gNB. In one example embodiment (for example, in an NTN network), a cell from the gNB is both the source cell and the target cell. In another example embodiment (for example, in an IAB network), the UE is synchronized (connected) to a same cell identified by a PCI, from the base station (for example, an IAB node) before the handover and after the handover.

FIG. 5 illustrates the operation of an exemplary method or methods, a result of execution of computer program instructions embodied on a computer readable memory, functions performed by logic implemented in hardware, and/or interconnected means for performing functions in accordance with exemplary embodiments. Each of the UE 110, gNB 170/170-1, and AMF 190/190-1 performs their corresponding operations under control of their respective control modules 140, 150, or 174.

This flow starts (step 0, zero) with an RRC CONNECTED UE 110 that is located in Country A 210-A, and is served by the gNB 170 and the source AMF 190.

In step 1, when the UE 110 moves (in step 0.5) from Country A 210-A to Country B 210-B, the UE sends an indication (e.g., a location report) of its location to the gNB 170. Alternatively, the gNB 170 may periodically request the UE to report its location, in order to determine whether the UE moves to a different country.

In step 2, based on the indication/location report from the UE, the gNB 170 detects whether the UE's serving AMF should be changed. In this case, since the UE has changed country, the serving AMF 190 should be changed. The gNB determines the target AMF 190-1 based on the UE's current location. The gNB 170 also selects the related cell ID of the gNB, in order for the target AMF 190-1 to select the current gNB as target to route the HO signaling.

In step 3, the gNB sends a NGAP HANDOVER REQUIRED message including an IE (or other indication) to identify the UE in the gNB (the source). The content of the IE may include the global gNB ID to identify the gNB serving the UE before the HO, and an ID (e.g., RAN UE NGAP ID) to identify the UE in the gNB. The content may be similar to the UE Context Reference at Source IE in the LTE specification (3GPP TS 38.413), but the usage is different (i.e., the LTE IE is used when the source node acts a target SN node, while there is no DC in this case). This information gets forwarded via step 4 from the source AMF 190 to the target AMF 190-1, for Country B 210-B.

For step 5, upon the reception of the NGAP HANDOVER REQUEST message, the gNB detects that the handover is related to an existing UE 110. This may be detected using the IE (e.g., or other indication) in the NGAP HANDOVER REQUEST message. The gNB is acting here as a target gNB 170-1. The gNB generates a RRCReconfiguration message with the information to reconfigure the new security, for example, new security key, the new security algorithm, and the like. The RRCReconfiguration also includes the time to execute the security (e.g., key, and security algorithm, and the like) change. For example, the gNB may indicate the time in terms of number of radio frames and/or slots. It can be also a UTC time or timer or anything else that allows the UE to determine the time to execute the security change.

The gNB sends the a NGAP HANDOVER REQUEST ACKNOWLEDGE message including the RRCReconfiguration message (also known as a HandoverCommand), which further includes the time information to the target AMF 190-1 in step 6. The RRCReconfiguration message is further forwarded to the source AMF 190 in step 7. The source AMF sends the NGAP HANDOVER COMMAND message including the RRCReconfiguration to gNB in step 8. The gNB is acting here as a source gNB 170. The gNB sends the RRCReconfiguration including the time information to the UE in step 9.

Alternatively, the time information to execute the security (e.g., key, and security algorithm, and the like) change may be generated by the source gNB 170, rather the target gNB 170-1. In one example embodiment, the N2-based handover procedure is used as shown in FIG. 5, for example, in the NTN network as shown in FIG. 2 or in in inter-donor IAB-node migration. When the gNB acting as source gNB 170 receives the NGAP HANDOVER COMMAND message in step 8, the gNB generates the time information, and sends the RRCReconfiguration including the time information to the UE in step 9. In another example embodiment, the Xn-based handover procedure is used (not shown in the figure), for example, in inter-donor IAB-node migration. When the gNB acting as source gNB 170 receives the XnAP HANDOVER REQUEST ACKNOWLEDGE message (not shown in the figure), the gNB generates the time information, and sends the RRCReconfiguration including the time information to the UE in step 9. When it is the same gNB acting as source gNB and acting as target gNB, the time information can be exchanged between the source gNB and the target gNB, for example, via internal communication between the source gNB and the target gNB, or any other implementation method.

Generating the time information in the "source" gNB may be beneficial in some scenarios. For example, when the gNB is implemented in the satellite and the AMF is implemented on the earth, there may be long delay for the communication between the gNB and the AMF. If the "target" gNB generates the time information, this time information may be inaccurate, considering the long delay from sending the NGAP HANDOVER REQUEST ACKNOWLEDGE message in step 6, until the RRCReconfiguration message is sent to the UE in step 9. When it is the "source" gNB that generates the time information, the time information can be more accurate, since the "source" gNB only need to consider the delay between the UE and the gNB.

Considering the high RTT in NTN, there may be are some DL transmissions that happened after the UE sends RRCReconfiguraitonComplete but before the gNB 170-1 receives the message, which will cause key ambiguity. The time-based configuration can avoid the ambiguity in both the UE and gNB.

In step 9, the gNB, acting as source gNB 170, sends the handover command to the UE 110, with indication of a security update without re-synch. In step 10, the UE performs a security update without random access. In step 10A, the gNB performs a security update for the UE. Steps 10 and 10A may happen, at least in part, in parallel. Steps 9 and 10 are additionally described in reference to FIG. 6, and steps 9 and 10A are additionally described in reference to FIG. 7.

Figure 6:
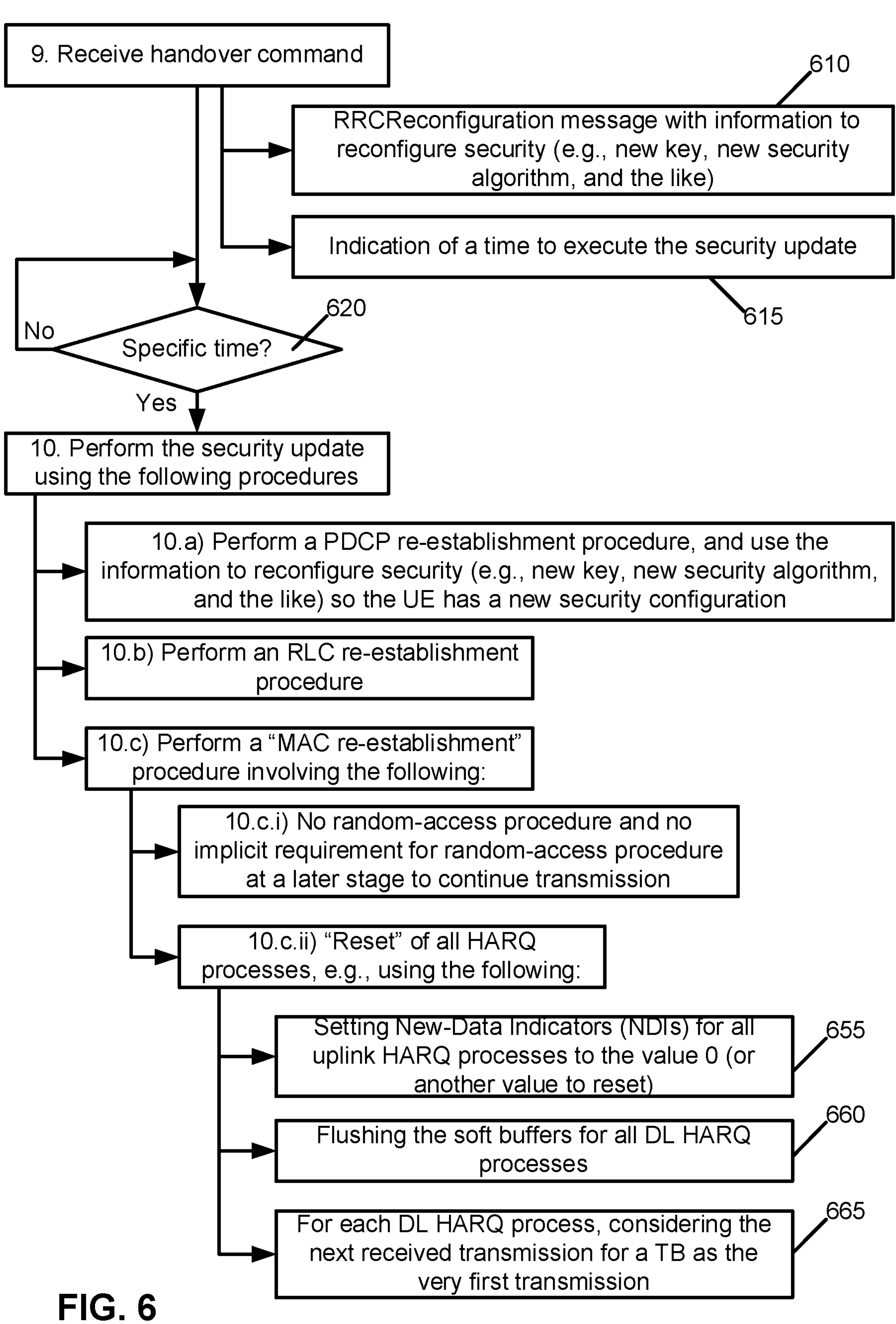
FIG. 6 is a logic flow diagram performed by a UE for performing a security update without resynchronization.

Turning to FIG. 6, this figure is a logic flow diagram performed by a UE for performing a security update without resynchronization. This figure also illustrates the operation of an exemplary method or methods, a result of execution of computer program instructions embodied on a computer readable memory, functions performed by logic implemented in hardware, and/or interconnected means for performing functions in accordance with exemplary embodiments. The UE is assumed to perform these operations under control of the control module 140.

In step 9, the RRCReconfiguration message is sent to the UE 110 by the source gNB 170 and is received by the UE. It is noted that generating the handover command to the UE is performed in [e.g., is the property of] the target gNB, but sending the handover command to the UE is performed by [e.g., is the property of] the source gNB. In one example embodiment, the time information is generated by the target gNB, for example, when the gNB receives the NGAP HANDOVER REQUEST message. In another example embodiment, the time information is generated by the source gNB, for example, when the gNB receives the NGAP HANDOVER COMMAND message. As previously stated, the RRCReconfiguration message comes with the information to reconfigure security (for example, create a new key, implement a new security algorithm, and the like) for a security update. This is illustrated by block 610. The RRCReconfiguration also includes the time to execute the security change. See block 615.

The UE 110 waits until the specific time as indicated by the time to execute the security change. This is realized by the UE's determining whether the specific time has been reached in block 620. If not (block 620=No), the UE continues to use current security configuration for communication with the serving cell and waits. If the specific time has been reached (block 620=Yes), the flow proceeds to step 10.

For step 10, at a specific time as received and indicated in step 9, the UE 110 performs the security update without random access, using the following procedures.

a) A PDCP re-establishment procedure. Sec, e.g., 3GPP TS 38.323, section 5.1.2. At least this procedure uses the information to reconfigure the security such as creating the new key, implementing the new security algorithm, and the like. This may result in a new key for the UE to use with the target gNB 170-1. Both a new key and a new security algorithm may be the result, too. Or just creating the new key or just an implementation of new security algorithm may be performed.

b) An RLC re-establishment procedure. See, e.g., 3GPP TS 38.322, section 5.1.2. For instance, according to section 5.1.2 of TS 38.22, when upper layers request an RLC entity re-establishment, the UE should discard all RLC SDUs, RLC SDU segments, and RLC PDUs, if any; stop and reset all timers; and reset all state variables to their initial values.

i) This is to clear the transmission/reception pipeline from PDCP PDUs protected with the previous key, which is also the purpose of the following HARQ-process-related actions at MAC layer (see below).

c) A new "MAC re-establishment" procedure involving the following.

i) No random-access procedure and no implicit requirement for random-access procedure at a later stage to continue transmission.

As an example of such an implicit requirement, it is noted that the current MAC-reset procedure involves considering all time-alignment timers as expired, which requires a random-access procedure in order to re-obtain uplink time alignment with the network, in order to continue with transmissions related to MAC-SDU transfer.

ii) "Reset" of all HARQ processes, e.g., by performing the following:

setting the New-Data Indicators (NDIs) for all uplink HARQ processes to the value 0 (zero), or any other value used to reset these, see block 665;

flushing the soft buffers for all DL HARQ processes, see block 660; and for each DL HARQ process, considering the next received transmission for a TB as the very first transmission, see block 665.

In step 11, the UE 110 sends an RRCReconfigurationComplete message to the gNB, acting now as target gNB 170-1. In step 12, the UE is served by the target gNB 170-1 and the target AMF 190-1.

It is noted that step 11 (synchronization) and step 12 (random access) from FIG. 3 are not used in FIG. 5.

It is noted that the procedures to perform the security update without random access may be performed, rather than sequentially, more or less simultaneously, but also in a coordinated manner. For instance, as part of PDCP re-establishment, the PDCP layer may retransmit non-acknowledged PDUs now protected with the new key. This retransmission should not, however, be performed before RLC re-establishment flushes all RLC buffers.

Figure 7:
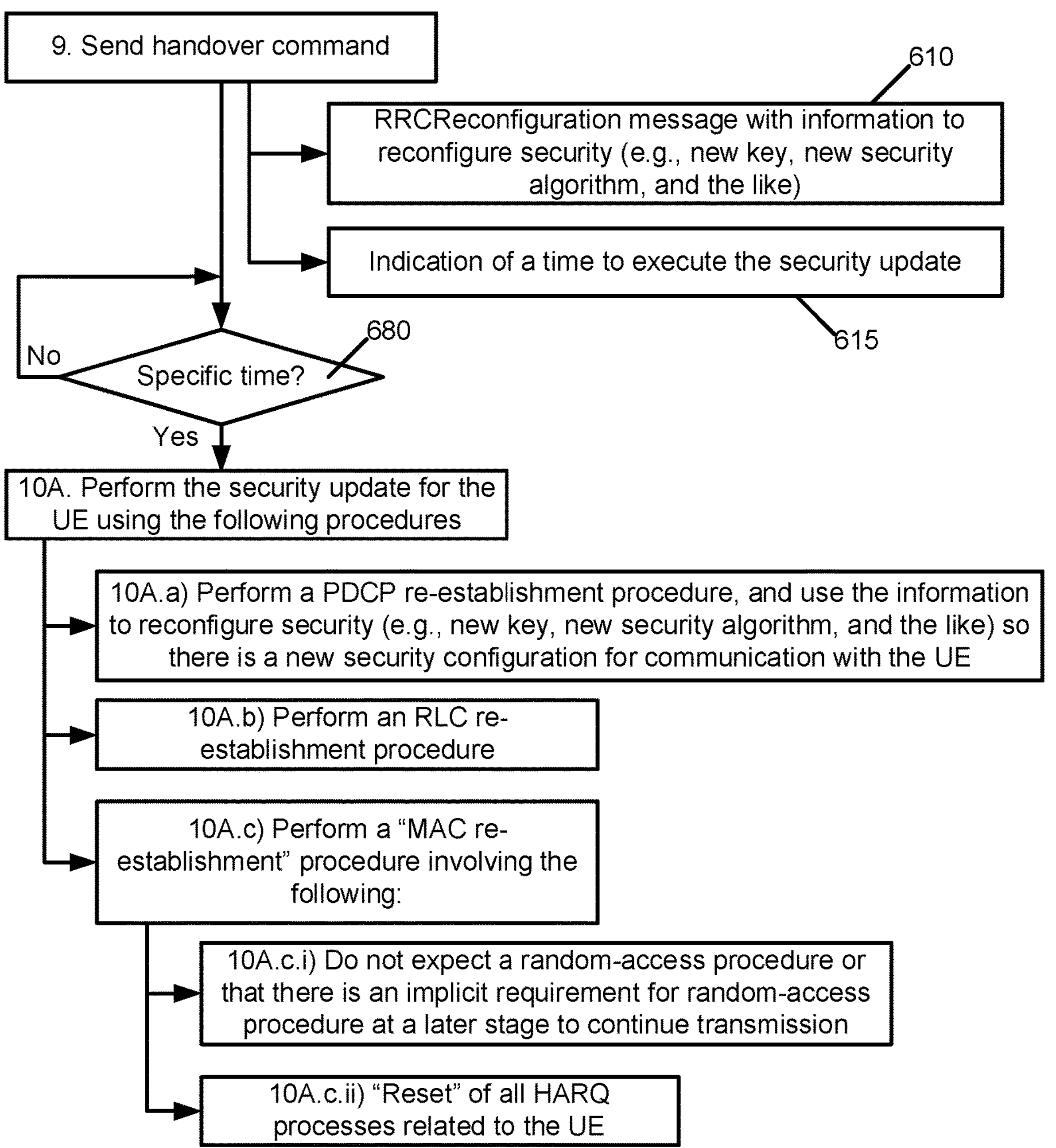
FIG. 7 is a logic flow diagram performed by a base station for performing a security update without resynchronization.

Turning to FIG. 7, this figure is a logic flow diagram performed by a base station for performing a security update without resynchronization. This figure also illustrates the operation of an exemplary method or methods, a result of execution of computer program instructions embodied on a computer readable memory, functions performed by logic implemented in hardware, and/or interconnected means for performing functions in accordance with exemplary embodiments. A base station is assumed to perform these operations, such as a gNB 170/170-1 (or other base station) under control of the control module 150. In this example, the base station is assumed to be a gNB, but this is merely exemplary.

In step 9, the RRCReconfiguration (or handover command) message is sent to the UE 110 by the source gNB 170. As described above, it is noted that generating the handover command to the UE is performed in [e.g., is the property of] the target gNB, but sending the handover command to the UE is performed by [e.g., is the property of] the source gNB. In one example embodiment, the time information is generated by the target gNB, for example, when the gNB receives the NGAP HANDOVER REQUEST message. In another example embodiment, the time information is generated by the source gNB, for example, when the gNB receives the NGAP HANDOVER COMMAND message. As previously stated, the RRCReconfiguration message comes with the information to reconfigure security (for example, create a new key, implement a new security algorithm, and the like) for a security update. This is illustrated by block 610. The RRCReconfiguration also includes the time to execute the security change. See block 615.

The gNB waits until the specific time as indicated by the time to execute the security change. This is realized by the gNB's determining whether the specific time has been reached in block 680. If not (block 680=No), the gNB continues to use current security configuration for communication with the UE and waits. If the specific time has been reached (block 680=Yes), the flow proceeds to step 10A.

For step 10A, at a specific time as sent and indicated in step 9, the gNB performs the security update for the UE 110, using the following procedures.

a) A PDCP re-establishment procedure. At least this procedure uses the information to reconfigure the security such as creating the new key, implementing the new security algorithm, and the like. This may result in at least a new key for the network node to use for communication with the UE. Both a new key and a new security algorithm may be the result, too. Or just creating the new key or just an implementation of new security algorithm may be performed.

b) An RLC re-establishment procedure.

i) This is to clear the transmission/reception pipeline from PDCP PDUs protected with the previous key, which is also the purpose of the following HARQ-process-related actions at MAC layer (see below).

c) A new "MAC re-establishment" procedure involving the following.

i) Do not expect a random-access procedure or that there is an implicit requirement for random-access procedure at a later stage to continue transmission. That is, no random-access procedure should be performed, either at an initial stage of the MAC re-establishment procedure or at any time within this procedure.

ii) A "reset" of all HARQ processes related to the UE.

It is further noted that FIGS. 5, 6, and 7 are related to NTN, but the techniques disclosed herein are not limited to NTN. This type of reconfiguration with synchronization between the UE and the network and security update is also involved in other areas, such as Integrated Access & Backhaul (IAB), and potentially other areas, where a security update needs to be performed for a UE (for example, due to a migration of the IAB node), and the serving cell for the UE remains unchanged after the security update.

It is further noted that FIGS. 5, 6, and 7 are related to N2-based handover, but the techniques disclosed herein are not limited to N2-based handover. This type of reconfiguration with synchronization between the UE and the network and security update is also involved in other areas, such as Xn-based handover, where a security update needs to be performed for a UE (for example, due to a migration of the IAB node), and the serving cell for the UE remains unchanged after the security update.

Furthermore, FIGS. 5, 6, and 7 use 5G terminology and devices (e.g., gNB, AMF), but the exemplary embodiments are also applicable to 4G (e.g., cNB, MME), or a network with a mixture of 5G and LTE, or other wireless networks where similar issues exist and/or the solutions described herein apply.

Without in any way limiting the scope, interpretation, or application of the claims appearing below, a technical effect and advantage of one or more of the example embodiments disclosed herein allows reconfiguring the security key in the UE when changing the AMF, without using a full reconfiguration with sync.

Additional exemplary embodiments include the following examples.

Example 1. A method, comprising:

receiving, at a user equipment in communication with a first serving cell of a base station, a command comprising information to perform a security update to a new security configuration and indication of a time to execute the security update to the new security configuration; and in response to the time occurring, performing, by the user equipment without performing a random-access procedure, the security update to the new security configuration to use for communication with a second serving cell.

Example 2. The method of example 1, wherein the first serving cell and the second serving cell are a same cell from the base station.

Example 3. The method of either example 1 or 2, wherein the base station is part of a non-terrestrial network.

Example 4. The method of example 1, wherein the first serving cell and the second serving cell are using a same physical cell identifier, and the method is performed for an integrated access and backhaul inter-donor central unit migration and handling for the user equipment whose serving integrated access and backhaul unit does not change during the migration.

Example 5. The method of any one of examples 1 to 4, wherein performing the security update comprises performing a packet data convergence protocol re-establishment procedure, and using the information to perform the security update to reconfigure security so the user equipment has, as part of the new security configuration, created a new key or implemented a new security algorithm, or both created the new key and implemented the new security algorithm.

Example 6. The method of example 5, further comprising performing a radio link control re-establishment procedure.

Example 7. The method of either one of examples 5 or 6, further comprising performing a medium access control re-establishment procedure.

Example 8. The method of example 7, wherein the medium access control re-establishment procedure does not involve a random-access procedure and does not have an implicit requirement for a random-access procedure at a later stage to continue transmission.

Example 9. The method of either example 7 or 8, further comprising resetting of all hybrid automatic repeat request processes of the user equipment.

Example 10. The method of example 9, wherein the resetting of all hybrid automatic repeat request processes of the user equipment further comprises:

setting new-data indicators for all uplink hybrid automatic repeat request processes to a value indicating the indicators are reset;

flushing the soft buffers for all downlink hybrid automatic repeat request processes; and for each downlink hybrid automatic repeat request process, considering a next received transmission for a transport block as a very first transmission.

Example 11. The method of any one of examples 1 to 10, wherein the information to perform the security update comprises information to create a new key or implement a new security algorithm, or both create the new key and implement the new security algorithm.

Example 12. The method of any one of examples 1 to 11, further comprising communicating by the user equipment with the serving cell of the base station using the new security configuration.

Example 13. The method of any one of examples 1 to 12, wherein the indication of a time to execute the security update to the new security configuration comprises at least one of the following:

number of radio frames or slots or radio frames and slots, or a timer, or a timestamp in a Universal Time Coordinated (UTC) time format.

Example 14. The method of example 13, further comprising determining by the user equipment that the time has occurred at least by performing one or more of the following:

in accordance with the number of radio frames or slots or radio frames and slots, determining the time has occurred, or in accordance with the timer, determining the time has occurred, or in accordance with the timestamp in the Universal Time Coordinated (UTC) time format, determining the time has occurred.

Example 15. A method, comprising:

at a base station in communication with a user equipment using a first serving cell, determining a need to perform a security update for the user equipment;

sending by the base station to the user equipment a command comprising information to perform the security update and indication of a time to execute the security update to change to a new security configuration; and in response to the time occurring, performing a security update to a new security configuration for use for communication with the user equipment using a second serving cell.

Example 16. The method of example 15, wherein the first serving cell and the second serving cell are a same cell from the base station.

Example 17. The method of example 16, wherein the time to execute the security update to change to the new security configuration is generated by:

the second serving cell acting as a target base station, in response to the base station receiving a handover request message; or by the first serving cell acting as a source base station, in response to the base station receiving a handover command message in a N2-based handover procedure, or in response to the base station receiving a handover request acknowledge in a Xn-based handover procedure.

Example 18. The method of any one of examples 15 to 17, wherein the base station is part of a non-terrestrial network.

Example 19. The method of example 15, wherein the first serving cell and the second serving cell are using a same physical cell identifier, and the method is performed for an integrated access and backhaul inter-donor central unit migration and handling for the user equipment whose serving integrated access and backhaul unit does not change during the migration.

Example 20. The method of any one of examples 15 to 19, wherein performing the security update comprises performing a packet data convergence protocol re-establishment procedure, and using the information to perform the security update to reconfigure security so the base station has, as part of the new security configuration, created a new key or implemented a new security algorithm, or both created the new key and implemented the new security algorithm.

Example 21. The method of example 20, further comprising performing a radio link control re-establishment procedure.

Example 22. The method of either one of examples 20 or 21, further comprising performing a medium access control re-establishment procedure.

Example 23. The method of example 22, wherein the base station, for the medium access control re-establishment procedure, does not expect a random-access procedure or that there is an implicit requirement for a random-access procedure at a later stage to continue transmission.

Example 24. The method of either example 22 or 23, further comprising resetting of all hybrid automatic repeat request processes related to the user equipment.

Example 25. The method of any one of examples 15 to 24, wherein the information to perform the security update comprises information to create a new key or implement a new security algorithm, or both create the new key and implement the new security algorithm.

Example 26. The method of any one of examples 15 to 25, further comprising communicating by the second serving cell with the user equipment using the new security configuration.

Example 27. The method of any one of examples 15 to 26, wherein the indication of a time to execute the security update to the new security configuration comprises at least one of the following:

number of radio frames or slots or radio frames and slots, or a timer, or a timestamp in a Universal Time Coordinated (UTC) time format.

Example 28. The method of example 27, further comprising determining by the base station that the time has occurred at least by performing one or more of the following:

in accordance with the number of radio frames or slots or radio frames and slots, determining the time has occurred, or in accordance with the timer, determining the time has occurred, or in accordance with the timestamp in the Universal Time Coordinated (UTC) time format, determining the time has occurred.

Example 29. An apparatus, comprising means for performing:

receiving, at a user equipment in communication with a first serving cell of a base station, a command comprising information to perform a security update to a new security configuration and indication of a time to execute the security update to the new security configuration; and in response to the time occurring, performing, by the user equipment without performing a random-access procedure, the security update to the new security configuration to use for communication with a second serving cell.

Example 30. The apparatus of example 29, wherein the first serving cell and the second serving cell are a same cell from the base station.

Example 31. The apparatus of either example 29 or 30, wherein the base station is part of a non-terrestrial network.

Example 32. The apparatus of example 29, wherein the first serving cell and the second serving cell are using a same physical cell identifier, and the receiving and performing the security update are performed for an integrated access and backhaul inter-donor central unit migration and handling for the user equipment whose serving integrated access and backhaul unit does not change during the migration.

Example 33. The apparatus of any one of examples 29 to 32, wherein performing the security update comprises performing a packet data convergence protocol re-establishment procedure, and using the information to perform the security update to reconfigure security so the user equipment has, as part of the new security configuration, created a new key or implemented a new security algorithm, or both created the new key and implemented the new security algorithm.

Example 34. The apparatus of example 33, further comprising performing a radio link control re-establishment procedure.

Example 35. The apparatus of either one of examples 33 or 34, further comprising performing a medium access control re-establishment procedure.

Example 36. The apparatus of example 35, wherein the medium access control re-establishment procedure does not involve a random-access procedure and does not have an implicit requirement for a random-access procedure at a later stage to continue transmission.

Example 37. The apparatus of either example 35 or 36, further comprising resetting of all hybrid automatic repeat request processes of the user equipment.

Example 38. The apparatus of example 37, wherein the resetting of all hybrid automatic repeat request processes of the user equipment further comprises:

- setting new-data indicators for all uplink hybrid automatic repeat request processes to a value indicating the indicators are reset;
- flushing the soft buffers for all downlink hybrid automatic repeat request processes; and
- for each downlink hybrid automatic repeat request process, considering a next received transmission for a transport block as a very first transmission.

Example 39. The apparatus of any one of examples 29 to 38, wherein the information to perform the security update comprises information to create a new key or implement a new security algorithm, or both create the new key and implement the new security algorithm.

Example 40. The apparatus of any one of examples 29 to 39, further comprising communicating by the user equipment with the serving cell of the base station using the new security configuration.

Example 41. The apparatus of any one of examples 29 to 40, wherein the indication of a time to execute the security update to the new security configuration comprises at least one of the following:

- number of radio frames or slots or radio frames and slots, or
- a timer, or
- a timestamp in a Universal Time Coordinated (UTC) time format.

Example 42. The apparatus of example 41, further comprising determining by the user equipment that the time has occurred at least by performing one or more of the following:

- in accordance with the number of radio frames or slots or radio frames and slots, determining the time has occurred, or
- in accordance with the timer, determining the time has occurred, or
- in accordance with the timestamp in the Universal Time Coordinated (UTC) time format, determining the time has occurred.

Example 43. An apparatus, comprising means for performing:

- at a base station in communication with a user equipment using a first serving cell, determining a need to perform a security update for the user equipment;
- sending by the base station to the user equipment a command comprising information to perform the security update and indication of a time to execute the security update to change to a new security configuration; and
- in response to the time occurring, performing a security update to a new security configuration for use for communication with the user equipment using a second serving cell.

Example 44. The apparatus of example 43, wherein the first serving cell and the second serving cell are a same cell from the base station.

Example 45. The apparatus of example 44, wherein the time to execute the security update to change to the new security configuration is generated by:

- the second serving cell acting as a target base station, in response to the base station receiving a handover request message; or
- by the first serving cell acting as a source base station, in response to the base station receiving a handover command message in a N2-based handover procedure, or in response to the base station receiving a handover request acknowledge in a Xn-based handover procedure.

Example 46. The apparatus of any one of examples 43 to 45, wherein the base station is part of a non-terrestrial network.

Example 47. The apparatus of example 43, wherein the first serving cell and the second serving cell are using a same physical cell identifier, and the determining, sending, and performing the security update are performed for an integrated access and backhaul inter-donor central unit migration and handling for the user equipment whose serving integrated access and backhaul unit does not change during the migration.

Example 48. The apparatus of any one of examples 43 to 47, wherein performing the security update comprises performing a packet data convergence protocol re-establishment procedure, and using the information to perform the security update to reconfigure security so the base station has, as part of the new security configuration, created a new key or implemented a new security algorithm, or both created the new key and implemented the new security algorithm.

Example 49. The apparatus of example 48, wherein the means are further configured to perform: performing a radio link control re-establishment procedure.

Example 50. The apparatus of either one of examples 48 or 49, wherein the means are further configured to perform: performing a medium access control re-establishment procedure.

Example 51. The apparatus of example 50, wherein the base station, for the medium access control re-establishment procedure, does not expect a random-access procedure or that there is an implicit requirement for a random-access procedure at a later stage to continue transmission.

Example 52. The apparatus of either example 50 or 51, wherein the means are further configured to perform: resetting of all hybrid automatic repeat request processes related to the user equipment.

Example 53. The apparatus of any one of examples 43 to 52, wherein the information to perform the security update comprises information to create a new key or implement a new security algorithm, or both create the new key and implement the new security algorithm.

Example 54. The apparatus of any one of examples 43 to 53, wherein the means are further configured to perform: communicating by the second serving cell with the user equipment using the new security configuration.

Example 55. The apparatus of any one of examples 43 to 54, wherein the indication of a time to execute the security update to the new security configuration comprises at least one of the following:

number of radio frames or slots or radio frames and slots, or a timer, or a timestamp in a Universal Time Coordinated (UTC) time format.

Example 56. The apparatus of example 55, wherein the means are further configured to perform: determining by the base station that the time has occurred at least by performing one or more of the following:

in accordance with the number of radio frames or slots or radio frames and slots, determining the time has occurred, or in accordance with the timer, determining the time has occurred, or in accordance with the timestamp in the Universal Time Coordinated (UTC) time format, determining the time has occurred.

Example 57. The apparatus of any preceding apparatus example, wherein the means comprises:

at least one processor; and at least one memory including computer program code, the at least one memory and computer program code configured to, with the at least one processor, cause the performance of the apparatus.

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

| | |
|---|---|
| 3GPP | third generation partnership project |
| 5G | fifth generation |
| 5GC | 5G core network |
| AMF | access and mobility management function |
| CU | central unit |
| DL | downlink |
| DC | dual connectivity |
| DU | distributed unit |
| eNB (or eNodeB) | evolved Node B (e.g., an LTE base station) |
| EN-DC | E-UTRA-NR dual connectivity |
| en-gNB or En-gNB | node providing NR user plane and control plane protocol terminations towards the UE, and acting as secondary node in EN-DC |
| EPC | evolved packet core |
| E-UTRA | evolved universal terrestrial radio access, i.e., the LTE radio access technology |
| GEO | Geostationary Earth Orbiting |
| HARQ | Hybrid Automatic Repeat Request |
| HO | handover |
| gNB (or gNodeB) | base station for 5G/NR, i.e., a node providing NR user plane and control plane protocol terminations towards the UE, and connected via the NG interface to the 5GC |
| IAB | Integrated Access & Backhaul |
| ID | identification |
| IE | information element |
| I/F | interface |
| LCID | logical-channel ID |
| LTE | long term evolution |
| MAC | medium access control |
| MCG | master cell group |
| MME | mobility management entity |
| MN | master node |
| MR-DC | multi-RAT dual connectivity |
| NAS | Non-Access Stratum |
| NDI | new data indicator |

-continued

| | |
|---|---|
| ng or NG | next generation |
| ng-eNB or NG-eNB | next generation eNB |
| NGAP | new generation access protocol |
| NR | new radio |
| NTN | non-terrestrial network |
| N/W or NW | network |
| PCell | primary cell |
| PCI | physical cell identifier |
| PDCP | packet data convergence protocol |
| PDU | Protocol Data Unit |
| PHY | physical layer |
| PSCell | primary secondary cell |
| RACH | Random Access Channel |
| RAN | radio access network |
| Rel | release |
| resync | resynchronization |
| RLC | radio link control |
| RRH | remote radio head |
| RRC | radio resource control |
| RTT | round trip time |
| RU | radio unit |
| Rx | receiver |
| SCG | secondary cell group |
| SDAP | service data adaptation protocol |
| SDU | service data unit |
| SGW | serving gateway |
| SMF | session management function |
| SN | secondary node |
| synch | synchronize |
| TB | transport block |
| TS | technical specification |
| Tx | transmitter |
| UE | user equipment (e.g., a wireless, typically mobile device) |
| UPF | user plane function |

What is claimed is:

1. A user equipment (UE) An apparatus, comprising
at least one processor; and
at least one memory comprising computer program code, the at least one memory and computer program code configured, with the at least one processor, to cause the UE at least to perform:
receiving, at the UE in communication with a first serving cell of a base station, a Radio Resource Control (RRC) reconfiguration command comprising:
information to perform a security update to a new security configuration,
an indication of a time to execute the security update to the new security configuration, wherein the indication of the time comprises at least one of: a number of radio frames or slots, a timer, or a timestamp in a Universal Time Coordinated (UTC) time format, and
an explicit indication to perform the security update without a re-synchronization procedure; and
based on determining that the indicated time has occurred, performing, by the UE without performing a random-access procedure, the security update to the new security configuration to use for communication with a second serving cell, wherein the first serving cell and the second serving cell are a same cell using a same physical cell identifier (PCI) before and after the security update, and wherein the security update is performed for a procedure selected from: a handover within a non-terrestrial network (NTN), and an integrated access and backhaul (IAB) inter-donor central unit migration wherein a serving IAB unit for the UE does not change during the IAB inter-donor central unit migration, and wherein the second serving cell uses a different New Radio (NR) Cell Global Identifier (NCGI) than the first serving cell after the IAB inter-donor central unit migration, and wherein performing the security update comprises:
performing a packet data convergence protocol (PDCP) re-establishment procedure, wherein performing the PDCP re-establishment procedure comprises at least one of creating a new key and implementing a new security algorithm;
performing a radio link control (RLC) re-establishment procedure, wherein the RLC re-establishment procedure is performed to clear a transmission and reception pipeline of data units protected with a previous security configuration before data units protected with the new security configuration are transmitted via the PDCP re-establishment procedure, wherein the RLC re-establishment procedure is performed by:
discarding all RLC service data units (SDUs), RLC SDU segments, and RLC protocol data units (PDUs);
stopping and resetting all timers associated with an RLC entity; and
resetting all state variables of the RLC entity to initial values; and
performing a medium access control (MAC) re-establishment procedure that includes resetting of all hybrid automatic repeat request (HARQ) processes of the UE by:
setting new-data indicators for all uplink HARQ processes to a reset value of zero;
flushing soft buffers for all downlink HARQ processes; and
for each downlink HARQ process, considering a next received transmission for a transport block as a very first transmission, wherein the MAC re-establishment procedure maintains an uplink time alignment and does not have an implicit requirement for a random-access procedure at a later stage to continue transmission.

2. The UE of claim 1, wherein the at least one memory and computer program code are configured, with the at least one processor, to further cause the UE at least to perform:
communicating by the UE with the second serving cell of the base station using the new security configuration.

3. The UE of claim 1, wherein the at least one memory and computer program code are configured, with the at least one processor, to further cause the UE at least to perform:
determining, by the UE, that the time has occurred based on one or more of the following:
a number of radio frames or slots comprised in the indication of the time;
a timer comprised in the indication of the time; or
a timestamp in a Universal Time Coordinated (UTC) time format comprised in the indication of the time.

4. A method performed by a user equipment (UE), the method comprising:
receiving, by the UE in communication with a first serving cell of a base station, a Radio Resource Control (RRC) reconfiguration command comprising:
information to perform a security update to a new security configuration, and
an indication of a time to execute the security update to the new security configuration, wherein the indication of the time comprises at least one of: a number of radio frames or slots, a timer, or a timestamp in a Universal Time Coordinated (UTC) time format, and an explicit indication to perform the security update without a re-synchronization procedure; and based on determining that the indicated time has occurred, performing, by the UE without performing a random-access procedure, the security update to the new security configuration to use for communication with a second serving cell, wherein the first serving cell and the second serving cell are a same cell using a same physical cell identifier (PCI) before and after the security update, and wherein the security update is performed for a procedure selected from: a handover within a non-terrestrial network (NTN), and an integrated access and backhaul (IAB) inter-donor central unit migration wherein a serving IAB unit for the UE does not change during the IAB inter-donor central unit migration, and wherein the second serving cell uses a different New Radio (NR) Cell Global Identifier (NCGI) than the first serving cell after the IAB inter-donor central unit migration, and wherein performing the security update comprises:

performing a packet data convergence protocol (PDCP) re-establishment procedure, wherein performing the PDCP re-establishment procedure comprises at least one of creating a new key and implementing a new security algorithm;

performing a radio link control (RLC) re-establishment procedure, wherein the RLC re-establishment procedure is performed to clear a transmission and reception pipeline of data units protected with a previous security configuration before data units protected with the new security configuration are transmitted via the PDCP re-establishment procedure, wherein the RLC re-establishment procedure is performed by:

discarding all RLC service data units (SDUs), RLC SDU segments, and RLC protocol data units (PDUs);

stopping and resetting all timers associated with an RLC entity; and resetting all state variables of the RLC entity to initial values; and performing a medium access control (MAC) re-establishment procedure that includes resetting of all hybrid automatic repeat request (HARQ) processes of the UE by:

setting new-data indicators for all uplink HARQ processes to a reset value of zero;

flushing soft buffers for all downlink HARQ processes; and for each downlink HARQ process, considering a next received transmission for a transport block as a very first transmission, wherein the MAC re-establishment procedure maintains an uplink time alignment and does not have an implicit requirement for a random-access procedure at a later stage to continue transmission.

5. The method of claim 4, wherein the UE determines that the indicated time has occurred by:

determining that a current radio frame number or slot number corresponds to the indicated number of radio frames or slots;

determining that the timer has expired; or determining that a current time corresponds to the timestamp in the Universal Time Coordinated (UTC) time format.

6. The method of claim 5, wherein the RRC reconfiguration command comprises a handover command received via a source base station that is also acting as a target base station for the procedure.

7. The method of claim 6, wherein the indication of the time to execute the security update is generated by the base station acting as a source base station in response to receiving a handover command message in an N2-based handover procedure or a handover request acknowledge in an Xn-based handover procedure.

8. The method of claim 7, wherein the PDCP re-establishment procedure further comprises retransmitting one or more non-acknowledged PDCP protocol data units using the new security configuration after completion of the RLC re-establishment procedure.

9. The method of claim 8, wherein the PDCP re-establishment procedure, the RLC re-establishment procedure, and the MAC re-establishment procedure are performed in a coordinated manner such that retransmission of PDCP protocol data units protected with the new security configuration is not performed before RLC buffers associated with the previous security configuration are flushed.

10. The method of claim 9, wherein the explicit indication to perform the security update without the re-synchronization procedure indicates that the UE is not to perform a random-access procedure and is not to consider time-alignment timers as expired.

11. The method of claim 10, wherein prior to the indicated time occurring, the UE continues communication with the first serving cell using the previous security configuration.

12. The method of claim 11, further comprising, after performing the security update, transmitting an RRC Reconfiguration Complete message to the base station using the new security configuration.

13. The method of claim 12, wherein the security update is performed while the UE remains in a RRC CONNECTED state and without detaching from the serving cell.

* * * * *